United States Patent
Jones

Patent Number: 6,007,933
Date of Patent: Dec. 28, 1999

[54] FUEL CELL ASSEMBLY UNIT FOR PROMOTING FLUID SERVICE AND ELECTRICAL CONDUCTIVITY

[75] Inventor: Daniel O. Jones, Glenville, N.Y.

[73] Assignee: Plug Power, L.L.C., Latham, N.Y.

[21] Appl. No.: 09/067,098

[22] Filed: Apr. 27, 1998

[51] Int. Cl.[6] .............. H01M 2/14; H01M 8/10; H01M 2/08; C25B 13/00; C25B 11/03

[52] U.S. Cl. .............. 429/38; 429/32; 429/36; 429/37; 429/39; 429/44; 204/282; 204/283; 204/284

[58] Field of Search ............. 429/32, 36, 37, 429/38, 39, 44; 204/282, 283, 284

[56] References Cited

U.S. PATENT DOCUMENTS

| | | | |
|---|---|---|---|
| 4,091,176 | 5/1978 | Alfenaar | 429/40 |
| 4,345,986 | 8/1982 | Korach | 204/266 |
| 4,410,410 | 10/1983 | Deborski | 204/277 |
| 4,476,002 | 10/1984 | Howard et al. | 204/283 |
| 4,602,426 | 7/1986 | Kampe et al. | 29/623.1 |
| 4,636,291 | 1/1987 | Divisek et al. | 204/283 |
| 5,482,792 | 1/1996 | Faita et al. | 429/30 |
| 5,558,948 | 9/1996 | Doyon | 429/40 |
| 5,565,072 | 10/1996 | Faita et al. | 204/256 |
| 5,707,755 | 1/1998 | Grot | 429/40 |
| 5,709,961 | 1/1998 | Cisar et al. | 429/32 |

Primary Examiner—Edna Wong
Attorney, Agent, or Firm—Heslin & Rothenberg, P.C.

[57] ABSTRACT

Fluid service and/or electrical conductivity for a fuel cell assembly is promoted. Open-faced flow channel(s) are formed in a flow field plate face, and extend in the flow field plate face between entry and exit fluid manifolds. A resilient gas diffusion layer is located between the flow field plate face and a membrane electrode assembly, fluidly serviced with the open-faced flow channel(s). The resilient gas diffusion layer is restrained against entering the open-faced flow channel(s) under a compressive force applied to the fuel cell assembly. In particular, a first side of a support member abuts the flow field plate face, and a second side of the support member abuts the resilient gas diffusion layer. The support member is formed with a plurality of openings extending between the first and second sides of the support member. In addition, a clamping pressure is maintained for an interface between the resilient gas diffusion layer and a portion of the membrane electrode assembly. Preferably, the support member is spikeless and/or substantially flat. Further, the support member is formed with an electrical path for conducting current between the resilient gas diffusion layer and position(s) on the flow field plate face.

44 Claims, 7 Drawing Sheets

FUEL CELL ASSEMBLY UNIT FOR PROMOTING FLUID SERVICE AND ELECTRICAL CONDUCTIVITY

STATEMENT OF GOVERNMENT RIGHTS

The Government of the United States of America has rights in this invention pursuant to Contract No. DE-AC02-94CE50389 awarded by the U.S. Department of Energy.

TECHNICAL FIELD

This invention relates, generally, to fuel cell assemblies and, more particularly, to fluid service, electrical conductivity, and mechanical support for components of fuel cell assemblies.

BACKGROUND ART

Fuel cells electrochemically convert fuels and oxidants to electricity, and fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial) environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates which serve as flow field plates for each fuel cell. Also, other fluid manifolds circulate coolant (e.g., water) for cooling.

As is known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely. So, the fuel and oxidant fed to each fuel cell are usually humidified. Furthermore, a cooling mechanism is commonly employed for removal of heat generated during operation of the fuel cells.

Flow field plates are commonly produced by any of a variety of processes. One plate construction technique, which may be referred to as "monolithic" style, compresses carbon powder into a coherent mass. Next, the coherent mass is subjected to high temperature processes which bind the carbon particles together, and convert a portion of the mass into graphite for improved electrical conductivity. Then, the mass is cut into slices, which are formed into the flow field plates. Usually, each flow field plate is subjected to a sealing process (e.g., resin impregnation) in order to decrease gas permeation therethrough and reduce the risk of uncontrolled reactions. Typically, flow field channels are engraved or milled into a face of the rigid, resin-impregnated graphite plate. In order to effectively distribute reactant fluid and/or humidification fluid for the PEM, it is desirable that the flow channels remain as open and unclogged as possible. As will be understood by those skilled in the art, it is further desirable that a mechanism be included in the fuel cell stack for occupying (e.g., longitudinal) space which can develop after initial assembly of the layers, to promote electrical conductivity and/or fluid(s) service therethrough.

Another known flow field configuration places a tridimensional network mattress with spiked surfaces, formed by metal-wire fibers, between a bipolar plate and an electrocatalytic electrode, which is in turn adjacent to an ion exchange membrane. The mattress acts as distributor for the reactants and products, in addition to providing deformability and resiliency in the electrochemical cell. The bipolar plate itself has planar surfaces without continuous or complete flow channels, and is formed from aluminum or other metal alloys capable of forming oxides. Such a design is disclosed in U.S. Pat. No. 5,482,792 to Faita et al. (entitled "Electrochemical Cell Provided With Ion Exchange Membranes and Bipolar Metal Plates," issued Jan. 9, 1996, and assigned to De Nora Parmelec S.p.A.) and U.S. Pat. No. 5,565,072 to Faita et al. (entitled "Electrochemical Cell Provided With Ion Exchange Membranes and Bipolar Metal Plates," issued Oct. 15, 1996, and assigned to De Nora Parmelec S.p.A.). A shortcoming of this design is the excessive material resource expense and weight, as well as the space consumption, in providing the mattress and plate. Another shortcoming is the non-uniformity in the fluid and pressure distributions resulting from the mattress.

Thus, a need exists for a mechanism for maintaining open and unclogged, flow channels of a flow field plate in a fuel cell assembly. A further need exists for such a mechanism which enhances conductivity through the fuel cell assembly. An additional need exists for the mechanism to promote stability and support for the fuel cell assembly.

SUMMARY OF THE INVENTION

Pursuant to the present invention, shortcomings of the existing art are overcome and additional advantages are provided through the provision of a fuel cell assembly unit. In one aspect of the invention, an open-faced flow channel is formed in a flow field plate face of a fuel cell assembly. The open-faced flow channel extends between entry and exit fluid manifolds for the fuel cell assembly. The open-faced flow channel is adapted to service at least one fluid for a membrane electrode assembly of the fuel cell assembly. A resilient gas diffusion layer is located between the flow field plate face and the membrane electrode assembly. The resilient gas diffusion layer is adapted to dynamically occupy a space in the fuel cell assembly. A support member includes first and second sides. The support member is formed with a plurality of openings extending between the first and second sides. The first side of the support member abuts the flow field plate face. The second side of the support member abuts the resilient gas diffusion layer. The second side of the support member restrains the resilient gas diffusion layer against entering the open-faced flow channel under a compressive force applied to the fuel cell assembly.

In another aspect of the invention, the second side of the support member can maintain a clamping pressure for an interface between the resilient gas diffusion layer and a portion of the membrane electrode assembly. The membrane electrode assembly can include a solid polymer electrolyte. The at least one fluid can include reactant fluid.

The resilient gas diffusion layer can include carbon fabric, carbon fiber paper, carbon cloth and/or carbon paper. The support member can comprise an expanded metal, an etched metal, a woven metal, a perforated foil, and/or a screen. The support member and/or the flow field plate face can comprise non-magnetic, austenitic stainless steel.

A number of the openings of the support member can communicate at least the at least one fluid, between the open-faced flow channel and the resilient gas diffusion layer. The support member can be spikeless and/or substantially flat. The flow field plate face can form solid sidewalls for the open-faced flow channel. The open-faced flow channel can have a preselected configuration.

A plurality of open-faced flow channels which are substantially parallel and/or generally serpentine can be formed in the flow field plate face. Also, the flow field plate face can form solid sidewalls for the plurality of open-faced flow channels. The second side of the support member can restrain the resilient gas diffusion layer against entering the plurality of open-faced flow channels under a compressive force applied to the fuel cell assembly.

The support member can be formed with an electrical path between the first and second sides of the support member. Also, the electrical path can conduct between the resilient gas diffusion layer and at least one position on the flow field plate face, electrical current generated by the fuel cell assembly. The at least one position on the flow field plate face can include a land on the flow field plate face.

The invention further contemplates a method for promoting fluid service for a fuel cell assembly. An open-faced flow channel extending between entry and exit fluid manifolds for the fuel cell assembly, is formed in a flow field plate face of the fuel cell assembly. The open-faced flow channel is adapted to service at least one fluid for a membrane electrode assembly of the fuel cell assembly. A resilient gas diffusion layer is located between the flow field plate face and the membrane electrode assembly. The resilient gas diffusion layer is adapted to dynamically occupy a space in the fuel cell assembly. The resilient gas diffusion layer is restrained against entering the open-faced flow channel under a compressive force applied to the fuel cell assembly. Also, the restraining of the resilient gas diffusion layer includes abutting a first side of a support member with the flow field plate face, and abutting a second side of the support member with the resilient gas diffusion layer. The support member is formed with a plurality of openings extending between the first and second sides of the support member, whereby fluid service is promoted.

In yet another aspect, the invention contemplates a method for promoting electrical conductivity for a fuel cell assembly. A resilient gas diffusion layer is located between a flow field plate face and a membrane electrode assembly of the fuel cell assembly. The resilient gas diffusion layer is adapted to dynamically occupy a space in the fuel cell assembly. A clamping pressure is maintained for an interface between the resilient gas diffusion layer and a portion of the membrane electrode assembly. The maintaining of the clamping pressure includes abutting a first side of a support member with the flow field plate face, and abutting a second side of the support member with the resilient gas diffusion layer. The support member is spikeless and/or substantially flat. The support member is formed with an electrical path between the first and second sides of the support member. The electrical path is adapted to conduct between the resilient gas diffusion layer and at least one position on the flow field plate face, electrical current generated by the fuel cell assembly, whereby electrical conductivity is promoted.

Thus, the present invention advantageously provides a simple construction for restraining resilient gas diffusion layer(s) from impingement and/or encroachment of flow field plate channel(s), and buttressing intimate contact between the resilient gas diffusion layer(s) and a membrane electrode assembly, which construction is conductive, easily-formable, and useable under compression.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a fuel cell assembly is provided in which conductive and communicative support member(s) restrain resilient gas diffusion layer(s) from obstructing flow field plate channel (s), and buttress the resilient gas diffusion layer(s) for intimate contact with a membrane electrode assembly.

Figure 1:
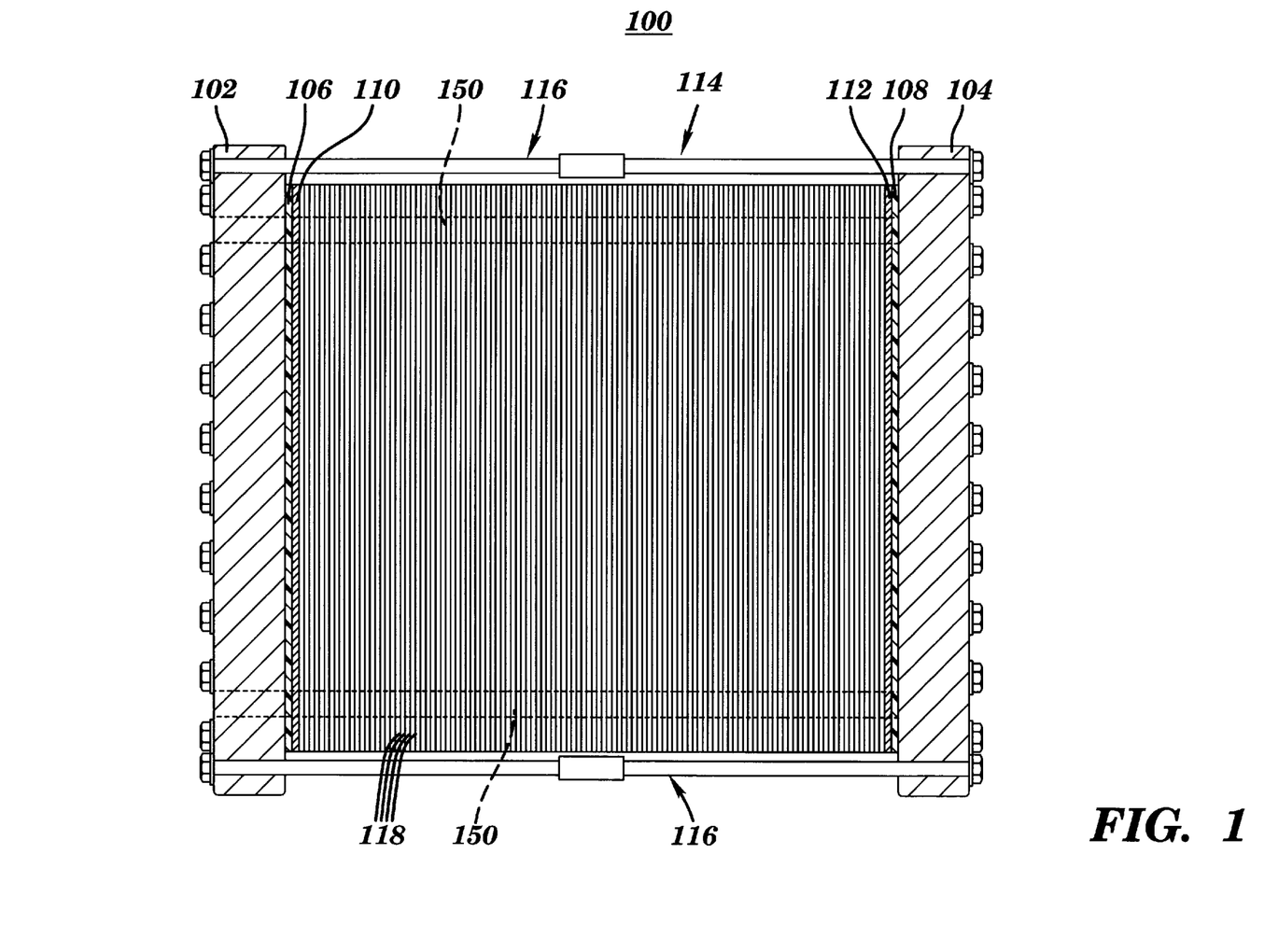
FIG. 1 is a sectional, elevation, side view of one example of a fuel cell assembly incorporating and using the fluid service and electrical conductivity capabilities of the present invention.

An example of a fuel cell assembly incorporating and using the novel features of the present invention is depicted in FIG. 1 and described in detail herein.

In this exemplary embodiment, a fuel cell assembly 100 includes end plates 102 and 104, insulation layers 106 and 108, and current collector/conductor plates 110 and 112, with a working section 114 therebetween. The working section includes one or more active sections and can include a selected number of cooling sections, as will be understood by those skilled in the art. In one aspect, the one or more active sections can further serve to perform cooling for the fuel cell assembly. A number of structural members 116, such as tie-bolt(s), can be employed to join the end plates.

Working section 114 includes a number of layers 118. The layers generally form fluid manifolds 150 for supplying fluids to, removing fluids from, and otherwise communicating and/or servicing fluids as desired within the working section, as will be appreciated by those skilled in the art. The layers of fuel cell assembly 100 might have applied thereto compressive pressure and/or stress which is approximately equivalent to, preferably, fifty to one thousand pounds per square inch, and, most preferably, two hundred to four hundred pounds per square inch.

Figure 3:
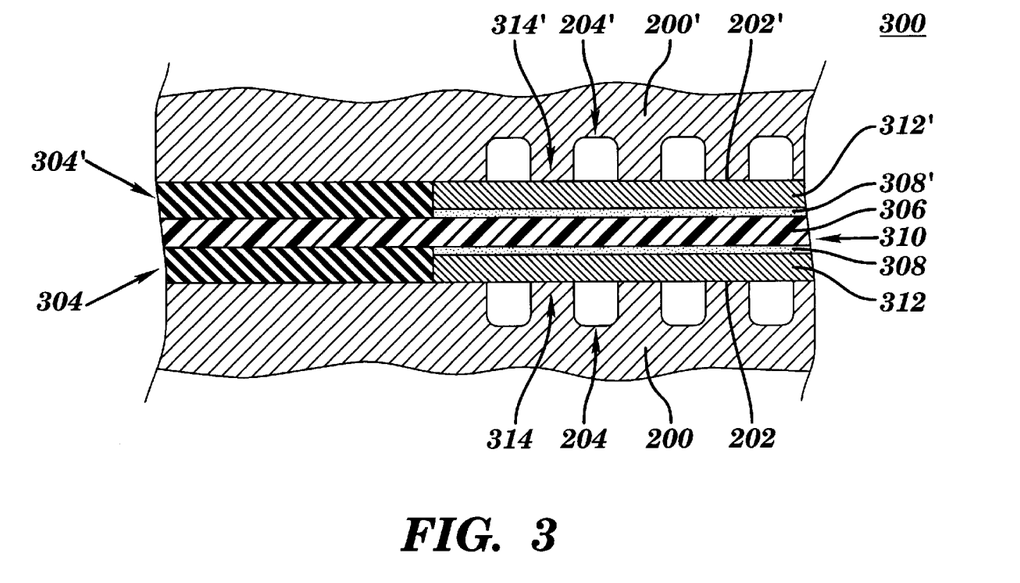
FIG. 3 is a cutaway, sectional, partial, side representation of fluid flow plates serving as flow field plates in a fuel cell of the fuel cell assembly of FIG. 1, in accordance with the principles of the present invention.

Preferably, a plurality of layers 118 form one or more (e.g., one hundred and eight) PEM-type fuel cells 300 (FIG. 3). The construction and utilization of PEM fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
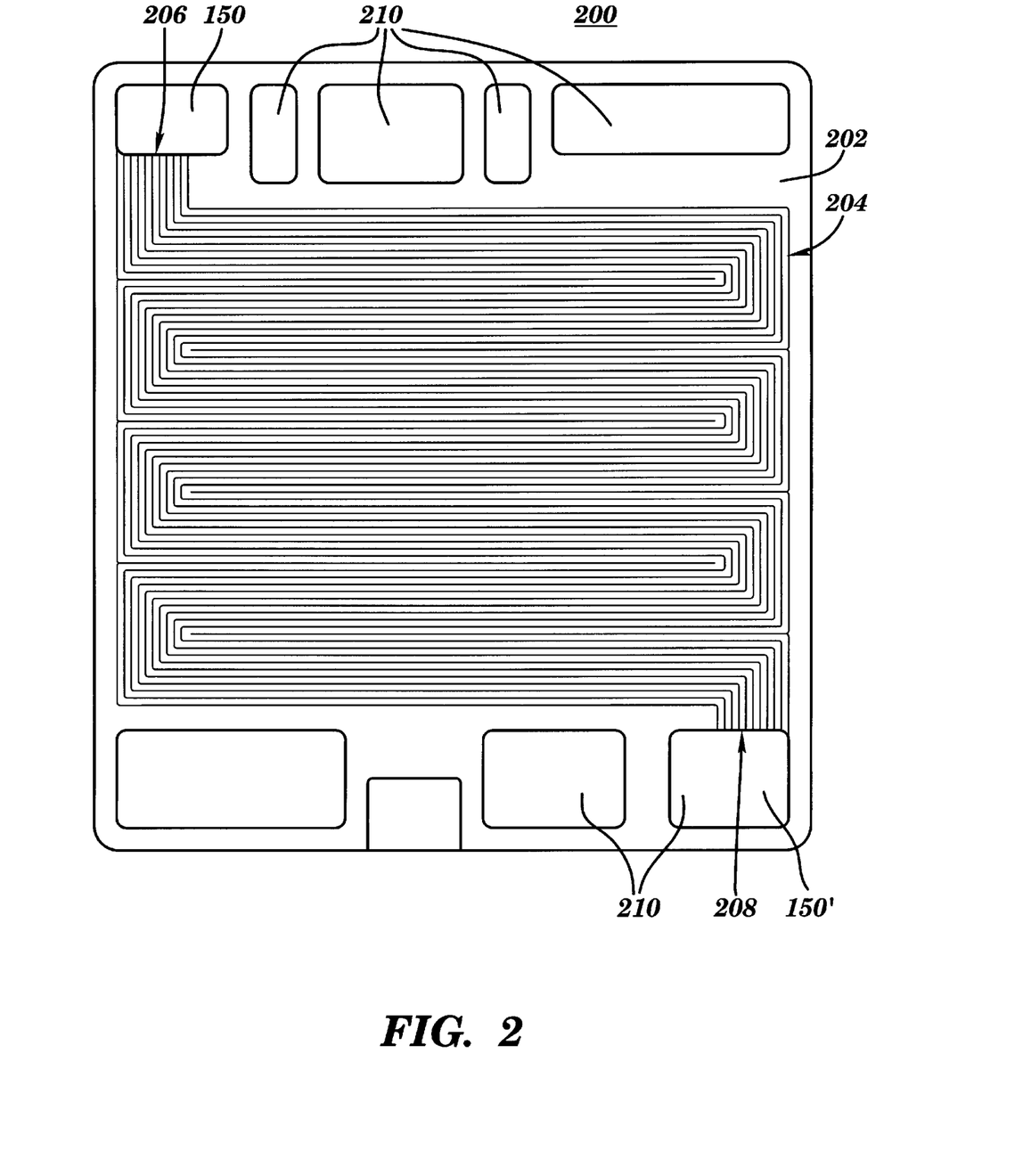
FIG. 2 is a plan view of an outer face of one example of a fluid flow plate of the fuel cell assembly of FIG. 1.

One example of a layer 118 of working section 114 is depicted in FIG. 2 as fluid flow plate 200. The plate has a fluid flow face 202 with one or more, for instance, substantially parallel and/or generally serpentine, flow channel(s) 204 thereon. The flow channels receive and transmit one or more fluids through ports 206 and 208 which are in fluid communication with corresponding fluid manifolds 150 and 150'. For example, the flow channels can include respective inlet(s) 206 and outlet(s) 208 in fluid communication with corresponding entry and exit fluid manifolds 150 and 150'.

In one embodiment, flow channel(s) 204, through formation of solid sidewalls in fluid flow face 202, may have any preselected configuration(s), such as for providing and/or ensuring maximal, even, continuous, appropriate, desired and/or uniform fluid service and/or coverage for active area(s) of MEA 310 (FIG. 3), as described herein.

As will be understood by those skilled in the art, a given fluid flow plate 200 may be a bipolar, monopolar, combined monopolar (e.g., anode cooler or cathode cooler), or cooling plate. In one example, the fluid flow plate serves as a flow field plate and flow channels 204 conduct fluid which includes reactant fluid for fuel cell assembly 100. The reactant fluid serves as fuel or oxidant for a given fuel cell 300 (FIG. 3). For instance, the flow channels can carry reactant gas (e.g., a fuel such as hydrogen or an oxidant such as air/oxygen) as well as vapor and/or liquid (e.g., humidification and/or product water), as will be understood by those skilled in the art.

A typical fluid flow plate 200 might have a height which is preferably in the range 1.0 to 20.0 in., and is most preferably in the range 6.0 to 10.0 in. Additionally, the width of the fluid flow plate is preferably in the range 1.0 to 20.0 in., and is most preferably in the range 5.0 to 9.0 in. Further, the thickness of the fluid flow plate is preferably in the range 0.02 to 0.30 in., and is most preferably in the range 0.05 to 0.15 in. Also, the cross-sectional dimension of width of a given flow channel 204 on face 202 is preferably in the range 0.01 to 0.10 in., and is most preferably in the range 0.02 to 0.05 in., with the cross-sectional dimension of depth of the flow channel preferably in the range 0.005 to 0.080 in., and most preferably in the range 0.010 to 0.050 in. In addition, the cross-sectional dimension of width of a land separating adjacent flow channel sections, for example, land 314, 314' (FIG. 3), is preferably in the range 0.01 to 0.10 in., and is most preferably in the range 0.02 to 0.05 in.

Referring to FIG. 2, fluid flow plate 200 has a number of (e.g., peripheral) holes 210 therethrough, which can cooperate in formation of fluid manifolds, such as fluid manifolds 150, of fuel cell assembly 100. Preferably, the perimeters of layers 118 are formed with minimal amounts of material disposed generally transversely beyond the active extent of working section 114 as well as the fluid manifolds of the fuel cell assembly, as represented in FIG. 2. In one example, the fluid flow plate may be formed with a material such as non-magnetic, austenitic stainless steel. In another example, a material such as titanium may be employed.

In one embodiment, gasketing material or gaskets 304, 304' (FIG. 3) can be employed to seal peripheral holes 210 (FIG. 2), and can cooperate with the longitudinal extents of layers 118 in formation of the fluid manifolds. Referring to FIG. 3, a given gasket 304, 304' might take the form of, for instance, a frame gasket made from a polytetrafluoroethylene ("PTFE") material manufactured by E. I. DuPont de Nemours Company and sold under the trademark TEFLON®. In another embodiment, O-ring gasket(s) might be employed.

For purposes of illustration, FIG. 3 depicts fuel cell 300 with fluid flow plates 200 and 200' serving as flow field plates. In particular, flow field plate 200 might serve as an anode side of the fuel cell, and flow field plate 200' might serve as a cathode side of the fuel cell. That is, face 202 might comprise an anode face, and face 202' might comprise a cathode face. For instance, flow channels 204 might carry hydrogen, as fuel, and humidification water (vapor and/or liquid). Further, flow channels 204' might carry air/oxygen, as oxidant, as well as humidification water (vapor and/or liquid) and/or product water (vapor and/or liquid), as will be understood by those skilled in the art.

Fuel cell 300 includes membrane or solid electrolyte 306. Preferably, solid electrolyte 306 comprises a solid polymer electrolyte made using a polymer such as a material manufactured by E. I. DuPont de Nemours Company and sold under the trademark NAFION®. Further, an active electrolyte such as sulfonic acid groups might be included in this polymer. In another example, the solid polymer electrolyte might be formed with a product manufactured by W. L. Gore & Associates (Elkton, Md.) and sold under the trademark GORE-SELECT®. Moreover, catalysts 308 and 308' (e.g., platinum), which facilitate chemical reactions, are applied to the anode and cathode sides, respectively, of the solid polymer electrolyte. This unit can be referred to as a "membrane electrode assembly" (hereinafter "MEA") 310. The MEA might be formed with a product manufactured by W. L. Gore & Associates and sold under the trade designation PRIMEA 5510-HS.

MEA 310 is sandwiched between anode and cathode gas diffusion layers (hereinafter "GDLs") 312 and 312', respectively, which are preferably formed with a resilient and conductive material such as carbon fabric, carbon fiber paper, carbon cloth or carbon paper.

An exemplary gas diffusion layer (hereinafter "GDL") 312, 312' may have a nominal thickness which is preferably in the range 0.005 to 0.030 in., and is most preferably in the range 0.010 to 0.020 in. In one example, resiliency of the GDL exists with respect to an operative condition thereof, for instance, under a certain range of compression in fuel cell assembly 100, and with a particular range of expected expansion and/or contraction for the GDL.

In one embodiment of a GDL 312, 312', porous carbon cloth or paper is infused with a slurry of carbon black and sintered with TEFLON® material. The anode and cathode GDLs serve as electrochemical conductors between catalyzed sites of solid polymer electrolyte 306 and the fuel (e.g., hydrogen) and oxidant (e.g., air/oxygen) which each flow in anode and cathode flow channels 204 and 204', respectively. Further, the GDLs also present to the surfaces of MEA 310 a combination of microscopic porosity and macroscopic porosity. Microscopic porosity allows reactant gas molecules to pass generally longitudinally from the flow channels to a surface of the MEA. Macroscopic porosity allows product water formed at the cathode surface of the MEA to be removed therefrom by flowing generally longitudinally into the cathode flow channels, to prevent flooding of the catalyst particles.

In one example, deionized water might be added to a given reactant gas stream conducted by flow channel(s) 204, 204'. The water would desirably serve to humidify membrane 306. In an alternative embodiment, such a reactant gas stream may be humidified in any of a variety of ways, as will be understood by those skilled in the art.

Referring to FIG. 3, it is desirable to provide maximal conductivity between catalyst 308 and contact position(s) on face 202, and between catalyst 308' and contact position(s) on face 202', as will be appreciated by those skilled in the art. That is, it is advantageous to maximize conductivity between the anode face of MEA 310 and the contact position(s) on the anode face 202, and between the cathode face of the MEA and the contact position(s) on the cathode face 202'.

For example, still referring to FIG. 3, lands 314 and 314' may serve as contact positions on corresponding anode and cathode faces 202 and 202'. The land(s) 314, 314' may be formed, for instance, with a material such as non-magnetic, austenitic stainless steel. In another example, a material such as titanium may be employed.

Referring further to FIG. 3, GDL 312 is located between lands 314 and (e.g., catalyst 308) the anode side of MEA 310, and GDL 312' is located between the lands 314' and (e.g., catalyst 308') the cathode side of the MEA.

Again referring to FIG. 3, in an attempt to promote conductivity between MEA 310 and lands 314, 314', one might choose to longitudinally compress fuel cell assembly 100 with a stress and/or pressure on the order of, for example, two hundred to four hundred pounds per square inch. However, such an approach to promoting conductivity by itself may be unsatisfactory, where GDLs 312 and 312' comprise resilient material, as described herein.

In one aspect, resiliency of GDLs 312 and 312' serves to promote conductivity for fuel cell assembly 100. At initial stacking of layers 118 for fuel cell assembly 100, resiliency of the GDLs can allow maximal conductive path(s) to be established between MEA 310 and contact position(s) on face(s) 202, 202', while accommodating imperfection(s) and/or shaping of adjacent component(s), as will be appreciated by those skilled in the art.

Moreover, following initial placement and compression of layers 118 of fuel cell assembly 100, space(s) and/or gap(s) can develop and/or be formed, as will be understood by those skilled in the art. For instance, a shift and/or separation might occur among the layers of the fuel cell assembly, such as during transportation and/or operation thereof. Should such space(s) develop proximate to a GDL 312, 312', in one example, resiliency of the GDL(s) may advantageously serve to occupy and/or close certain (e.g., proximate) space(s), and maintain conductive path(s) between surface(s) of MEA 310 and contact position(s) on face(s) 202, 202'. Furthermore, a certain degree of resiliency in the fuel cell assembly is desirable, for instance, in order to maintain pressure for an interface between the MEA and GDLs, in view of thermal expansion of various component(s), such as during start-up, shut-down, and/or loading variation(s).

In another aspect, resiliency of GDLs 312 and 312' serves to promote fluid service for fuel cell assembly 100. Namely, in one example, by occupying and/or closing certain (e.g., proximate) space(s) and/or gap(s), the GDL(s) may ensure reactant fluid and/or humidification water (vapor and/or liquid) is communicated, guided, dispersed and/or distributed substantially evenly between MEA 310 and flow channel(s) 204, 204', thereby desirably preventing starvation of portion(s) of the MEA and/or promoting maximal performance of fuel cell 300. Further, the GDL(s) may ensure proper communication of product fluid (e.g., vapor and/or liquid water), unused humidification water (vapor and/or liquid), and/or unused reactant fluid, from the MEA to the flow channel(s), thereby advantageously preventing flooding of portion(s) of the MEA and/or promoting enhanced operation of the fuel cell.

Referring to FIG. 1, in order to assist in closing of such gap(s) within fuel cell assembly 100, one may optionally dispose a bevel spring (not shown) between end plate 102, 104 and a nut for a tie-bolt serving as a structural member 116, as will be understood by those skilled in the art.

However, in some typical circumstance(s), unchecked resiliency of the GDLs in the fuel cell assembly can pose and/or present a shortcoming, for which the present invention advantageously provides a remedy, as described herein.

Figure 4:
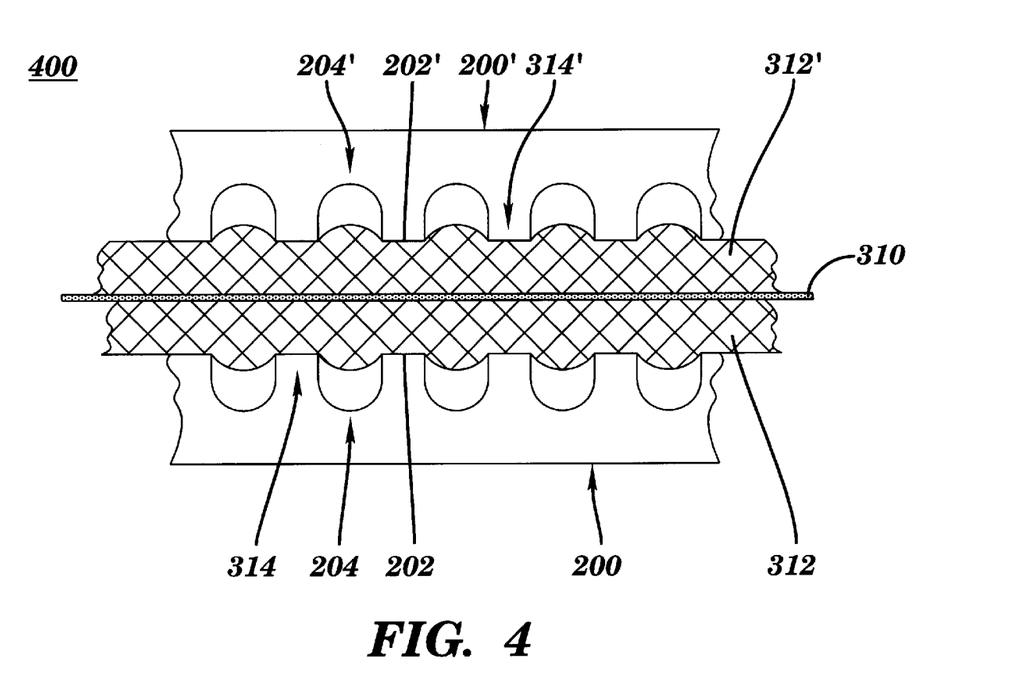
FIG. 4 is a cutaway, sectional, partial, side representation of gas diffusion layers entering flow channels on flow field plate faces in a fuel cell of a fuel cell assembly.

For purposes of illustration, FIG. 4 depicts fuel cell 400 whose performance is diminished under a longitudinal compression applied thereto. In particular, a compressive stress and/or pressure (e.g., naively) aimed at promoting conductivity through GDL 312, 312', has attendant deleterious consequence(s) of encouraging, permitting, and/or allowing the GDL(s) to encroach upon, impinge, deflect and/or sag into certain and/or corresponding flow channel(s) 204, 204', in view of the resiliency of the GDL(s). As will be understood by those skilled in the art, the consequent restriction, blockage, obstruction and/or clogging of the flow channel(s) can undesirably decrease and/or alter fluid flow and/or fluid throughput, thereby harming and/or reducing fluid(s) service for MEA 310.

Furthermore, as will be understood by those skilled in the art, such restriction, blockage, obstruction and/or clogging of flow channel(s) 204, 204' can disadvantageously increase pressure drop across a fluid flow face 202, 202', that is, between entry and exit fluid manifolds 150, 150', thereby requiring extra energy for operation of the fuel cell assembly.

The present invention serves to reduce such harm(s) to fuel cell assembly 100, as described herein.

Figure 5:
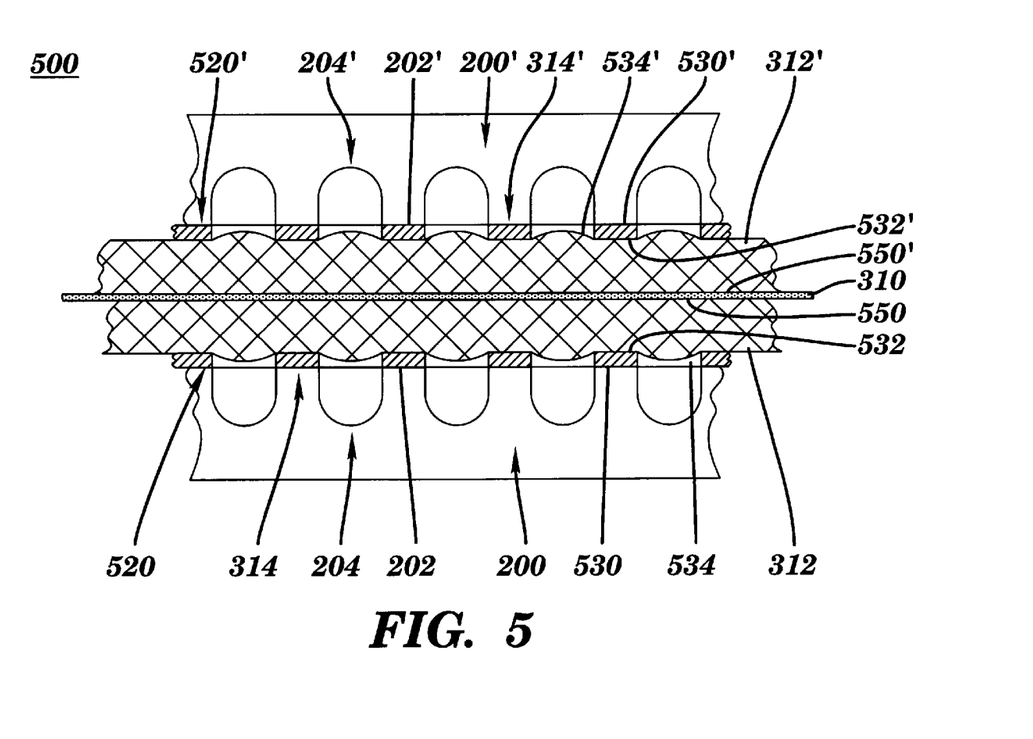
FIG. 5 is a cutaway, sectional, partial, side representation of a first exemplary embodiment of support members disposed in a fuel cell of the fuel cell assembly of FIG. 1, illustrating the support members holding gas diffusion layers out of flow field plate channels, and buttressing contact between a membrane electrode assembly and the gas diffusion layers, in accordance with the principles of the present invention.

As depicted in FIG. 5, fuel cell 500 advantageously includes support members 520, 520' located between respective GDLs 312, 312' and corresponding flow faces 202, 202', in accordance with the principles of the present invention.

For instance, support member 520 may be formed from an expanded metal (e.g., support member 620 depicted in FIGS. 6–8), an etched metal (e.g., support member 720 depicted in FIGS. 9–11), a woven metal (e.g., support member 820 depicted in FIGS. 12–14), a perforated foil, or a screen. In one example, the support member may be formed with a material such as non-magnetic, austenitic stainless steel. In another example, a material such as titanium may be employed.

Referring to FIG. 5, support member 520 includes first side 530 and second side 532. Also, the support member is formed with openings 534 extending therethrough, for fluid communication between flow channel(s) 204 and GDL 312.

Again referring to FIG. 5, first side 530 of support member 520 abuts flow field plate face 202. Further, second side 532 of the support member abuts GDL 312. Advantageously, the second side of the support member serves to restrain the GDL against entering flow channel(s) 204, such as under a compressive force applied to fuel cell assembly 100.

So, support member 520 desirably serves to promote fluid service for MEA 310. By preventing restriction, blockage, obstruction and/or clogging of flow channel(s) 204 which might otherwise occur owing to excursion and/or deflection of the GDL(s) thereinto, the present invention serves to avoid pressure-drop increase(s) along the flow channel lengths, for advantageous energy savings, flow uniformity, and/or performance.

Still referring to FIG. 5, in another aspect of the invention, second side 532 of support member 520 can maintain a clamping pressure for interface 550 between GDL 312 and MEA 310. Therefore, the support member serves to promote electrical conductivity for fuel cell assembly 100. In particular, the invention serves to increase contact pressure between the MEA and GDL(s), for enhanced mechanical support, electrical conductivity, and/or operability.

As can be understood through examination of FIGS. 5–14, in a further aspect of the invention, support member 520 may serve to provide transverse conductive path(s) between GDL 312 and contact position(s) (e.g., lands 314) of fluid flow face 202. For instance, the support member may provide enhanced electrical coupling for the GDL(s), such as over section(s) of the flow channel(s) where the GDL(s) would otherwise be uncoupled. In one example, electrons may be conducted through the support member generally transversely, between the contact position(s), such as the land(s), of the fluid flow face, and position(s) of the GDL(s) located over the flow channel(s), in accordance with the principles of the present invention.

Again referring to FIG. 5, the present invention provides comparable and/or cooperative mechanical support, electrical conductivity, and/or operability advantage(s) with respect to first side 530', second side 532', and conductive path(s) of support member 520', as well as with respect to interface 550' between GDL 312' and MEA 310.

As will be appreciated by those skilled in the art, dimension(s) and/or feature(s) of support member(s) in accordance with the present invention, can be suited and/or adapted for use with particular component(s) of fuel cell assembly 100. For illustrative purposes, FIG. 5 depicts matched, coordinated, and/or aligned pitch among openings 534 of support member 520 and portions of flow channel(s) 204, as well as among certain solid parts of the support member and portions of lands 314, with the thickness of the support member cooperatively serving to hold GDL 312 out of the flow channel(s). Design choice(s) allow numerous variation(s) among such relationship(s), in accordance with the principles of the present invention. For example, referring to FIG. 5, the pitch for the support member might be uniformly or non-uniformly (e.g., fractionally) reduced, so solid section(s) of the support member superimpose part(s) of the flow channel(s), and/or the opening(s) might be staggered. In one example, the openings may have any appropriate shape(s) and/or preselected configuration(s).

Furthermore, design choice(s) allow cooperative and/or coordinated selection among configuration(s) and/or orientation(s) for the support member(s), and configuration(s) and/or orientation(s) for flow channel(s) 204, in accordance with the principles of the present invention. For explanatory purposes, FIGS. 6, 9, and 12 depict exemplary relative orientations for the support members 620, 720, and 820, respectively, with respect to illustrative, relative, lengthwise orientations 540, 542, and 544, respectively, for one or more of straight, serpentine, and/or parallel flow channel(s) 204 (FIGS. 2 and 5).

Figure 6:
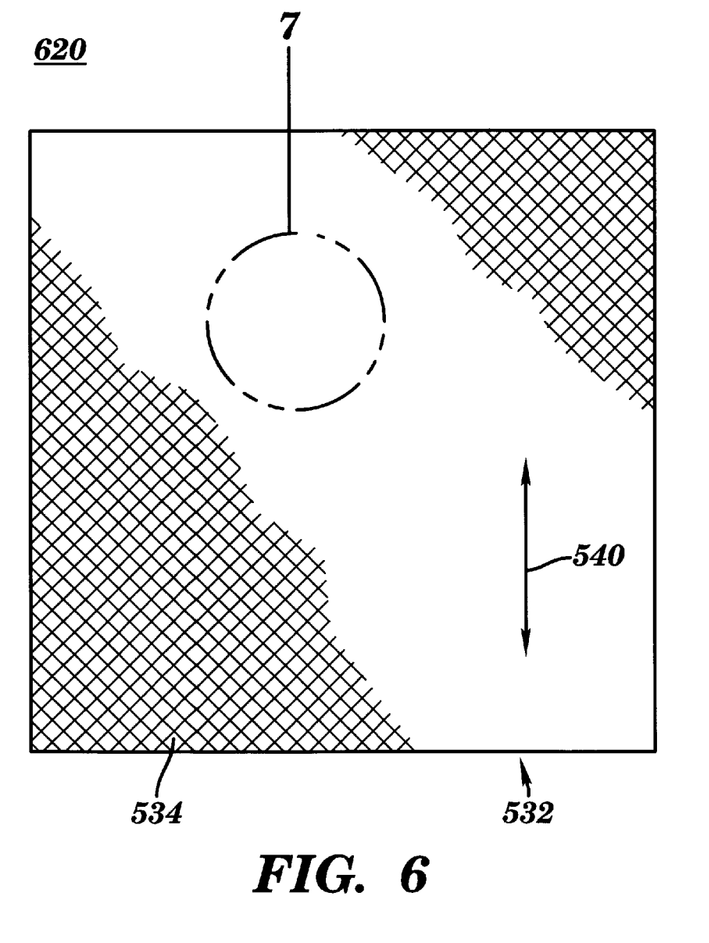
FIG. 6 is a plan view of a second exemplary embodiment of the support member of the present invention, illustrating the support member as an expanded metal.
Figure 7:
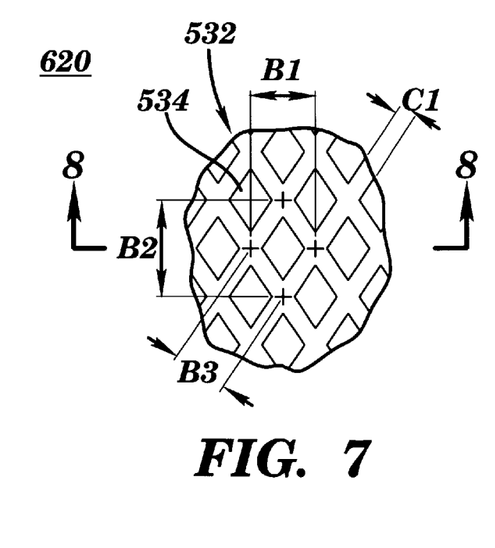
FIG. 7 is a magnified, cutaway, partial, plan view directed at the region of the support member of FIG. 6 indicated by reference numeral 7.
Figure 8:
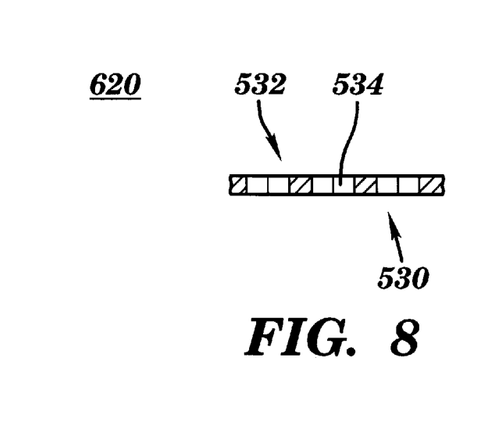
FIG. 8 is a cutaway, sectional, partial view directed substantially along line 8—8 of FIG. 7.
Figure 9:
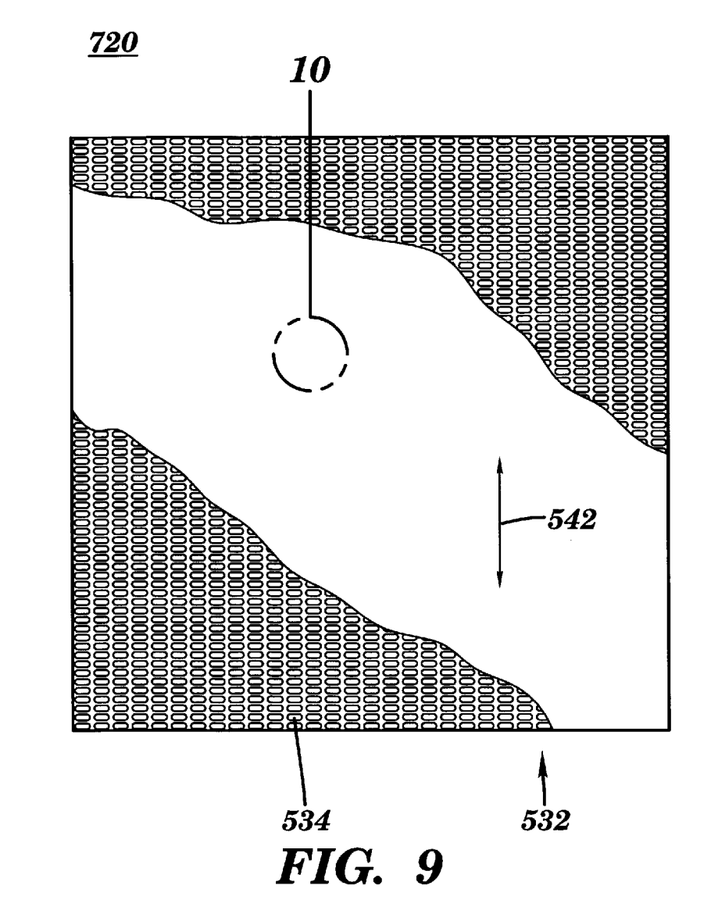
FIG. 9 is a plan view of a third exemplary embodiment of the support member of the present invention, illustrating the support member as an etched metal.
Figures 10, 11:
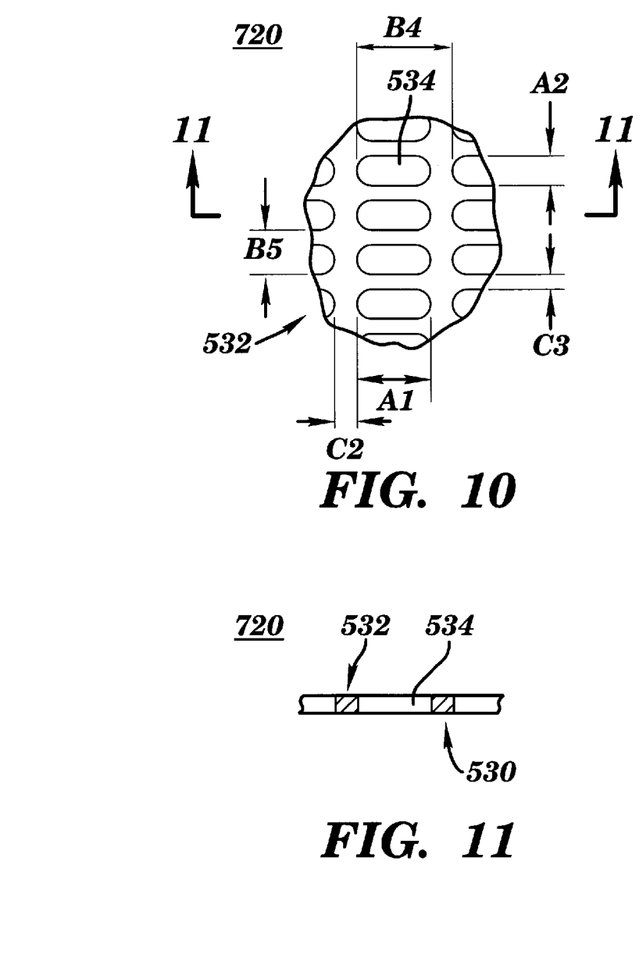
FIG. 10 is a magnified, cutaway, partial, plan view directed at the region of the support member of FIG. 9 indicated by reference numeral 10.
FIG. 11 is a cutaway, sectional, partial view directed substantially along line 11—11 of FIG. 10.
Figure 12:
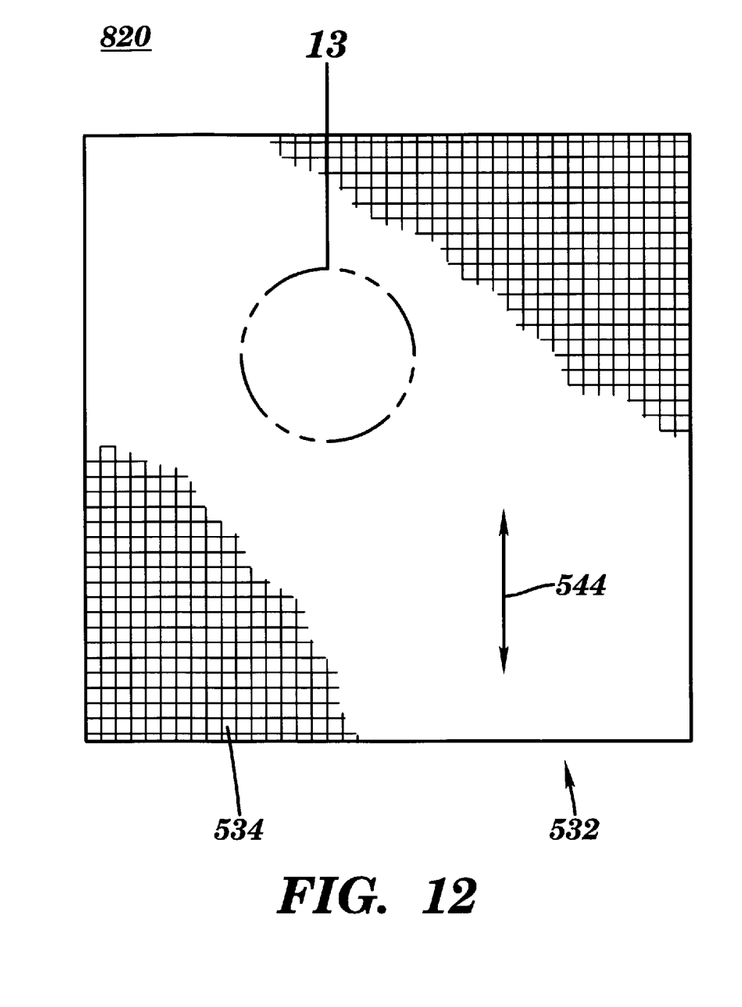
FIG. 12 is a plan view of a fourth exemplary embodiment of the support member of the present invention, illustrating the support member as a woven metal.
Figure 13:
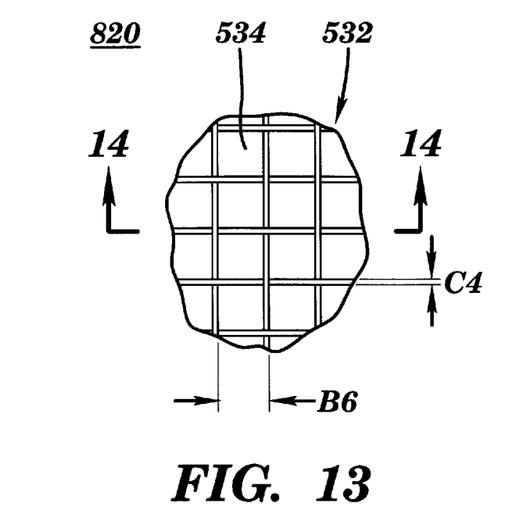
FIG. 13 is a magnified, cutaway, partial, plan view directed at the region of the support member of FIG. 12 indicated by reference numeral 13.
Figure 14:
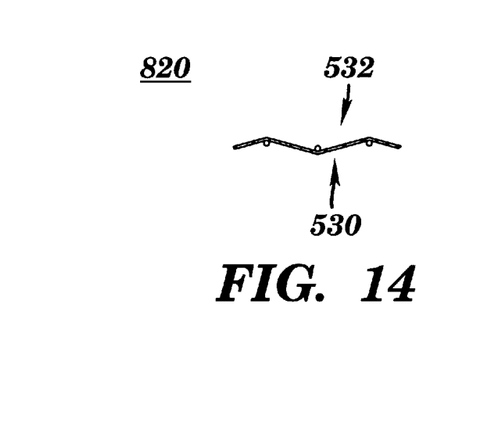
FIG. 14 is a cutaway, sectional, partial view directed substantially along line 14—14 of FIG. 13.

For purposes of illustration, FIGS. 5–14 depict a number of exemplary constructions for support member(s), such as support member 520 (FIG. 5), of the present invention. In one example, support member 620 may comprise an expanded metal, as depicted in FIGS. 6–8. In another example, support member 720 may comprise an etched metal, as depicted in FIGS. 9–11. In a further example, support member 820 may comprise a woven metal, as depicted in FIGS. 12–14.

A typical support member, such as one or more of support members 520, 620, 720 and 820, might have a thickness which is preferably in the range 0.001 to 0.016 in., and is most preferably in the range 0.002 to 0.008 in. Also, major and minor transverse dimensions (e.g., exemplary dimensions A1 and A2 depicted in FIG. 10) of a given opening 534 are preferably in the range 0.005 to 0.080 in., and are most preferably in the range 0.010 to 0.040 in. Moreover, a pitch (e.g., one or more of distances B1–B6 depicted in FIGS. 7, 10, and 13) between successive openings 534 is preferably in the range 0.010 to 0.100 in., and is most preferably in the range 0.020 to 0.050 in. In addition, a transverse dimension (e.g., one or more of dimensions C1–C4 depicted in FIGS. 7, 10, and 13) of material interposed between successive openings 534 is preferably in the range 0.002 to 0.040 in., and is most preferably in the range 0.004 to 0.020 in.

In a preferred embodiment, support member 520 may be formed spikeless and/or substantially flat, such as is represented in FIGS. 5, 8, 11, and 14. In one aspect, such spikelessness and/or substantial flatness provides a good electrical interface between mating surfaces of first side 530 and contact position(s) (e.g., lands 314) of fluid flow face 202. In another aspect, such spikelessness and/or substantial flatness provides, enhances, and/or buttresses uniform, non-destructive, and/or thorough mating between active area(s) of MEA 310 and GDL(s) 312, 312'.

In one example, spikelessness, substantial flatness, and/or integrity of support member 520 serves to minimize occurrence(s) and/or adverse effect(s) of deflection(s) in fuel cell assembly 100.

Referring to FIG. 1 and as will be understood by those skilled in the art, when various component(s) and layers 118 of fuel cell assembly 100 are compressed between end plates 102 and 104, a deflection may present a problem, since the component(s) and layers consequently might tend to not be held together as tightly as planned and/or desired. In one aspect, electrical conductivity may be enhanced by maximizing contact among the layers of the fuel cell assembly, which contact may often be premised upon the mating and/or meeting of adjacent (e.g., substantially flat) surfaces. However, deflection(s) may force imperfection(s) and/or defect(s) into such arrangement(s), for decreased performance of the fuel cell assembly.

So, as can be understood through examination of flow channel(s) 204, 204' depicted in FIGS. 2 and 5, support member(s) 520, 520', 620, 720, 820 depicted in FIGS. 5–14, and GDL(s) 312, 312' depicted in FIG. 5, in accordance with the principles of the present invention, the support member may provide enhanced stability to the GDL(s), such as over section(s) of the flow channel(s) where the GDL(s) would otherwise be (e.g., generally and/or externally) longitudinally unsupported. Such enhanced stability may advantageously serve to more uniformly and/or evenly distribute force(s) and/or pressure(s), for instance, for superior, improved, and/or more thorough electrical coupling among surface(s) of MEA 310 and the GDL(s).

Flow channel(s) 204 may be formed with variable cross section(s), in accordance with the principles of the subject invention.

Where a plurality of flow channels carry certain fluid on a given fluid flow face between entry and exit fluid manifolds, each of the plurality of flow channels is preferably formed having substantially the same length. By designing the flow channels to have substantially identical length, one largely prevents variance in pressure drop among the flow channels, thereby promoting uniform and equal flow as well as superior overall performance. Further, any variance in cross-section along a given flow channel, is preferably substantially duplicated for companion flow channel(s) on the same fluid flow face which carry the same fluid for a same fuel cell.

A given fluid flow plate of the present invention which conducts fluids on both faces might be configured so the fluids have, for example, parallel flow or counter flow among various (e.g., generally serpentine) flow channels. In particular, a parallel flow configuration might generally transversely align flow on the opposing faces by positioning corresponding first and second inlets at opposite sides of a first corner of the plate, and corresponding first and second outlets at opposite sides of a generally diametrically opposed second corner of the plate. Further, a counter flow design might provide flow in generally transversely opposite directions on the opposing faces by placing first inlet(s) and second outlet(s) at opposite sides of a first corner of the plate, and first outlet(s) and second inlet(s), respectively, at opposite sides of a generally diametrically opposed second corner of the plate.

Operation of a fuel cell assembly of the present invention can include periods or intervals of action and inaction, such as an active use followed by idling. Also, the fuel cell assembly can be employed for varied (e.g., automotive to aerospace to industrial) applications, in various environments.

Numerous alternative embodiments of the present invention exist. Fluid flow plate 200 and/or fluid manifold(s) 150, 150' could serve any desired function with any appropriate orientation, shape, and/or formation in any position of fuel cell assembly 100. Further, fluid flow face 202 could easily have any number of flow channels 204. Any flow channel 204 could easily have any appropriate shape or structure. Also, flow channel(s) 204 could easily be configured to deviate, to any desired degree, from parallel alignment and/or serpentine design. Moreover, any of port(s)/inlet(s) 206 and/or port(s)/outlet(s) 208 might employ any mechanism for fluid communication between appropriate flow channel(s) 204 and fluid manifold(s) 150, 150'. Design choices permit variation in construction technique(s) and/or material(s) for any portion of fluid flow plate 200 and/or fuel cell assembly 100. Furthermore, fluid flow plate(s) 200 could easily be employed in any appropriate type(s) of fuel cell(s). Additionally, working section 114 could easily include any desired type(s) of fuel cell(s).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of promoting fluid service for a fuel cell assembly, said method comprising:

providing a flow field plate of said fuel cell assembly, said flow field plate having an open-faced flow channel formed in a face of said plate and extending between entry and exit fluid manifolds for said fuel cell assembly, said open-faced flow channel adapted to service at least one fluid for a membrane electrode assembly of said fuel cell assembly;

locating a resilient gas diffusion layer between said flow field plate face and said membrane electrode assembly, said resilient gas diffusion layer adapted to dynamically occupy a space in said fuel cell assembly; and restraining said resilient gas diffusion layer against entering said open-faced flow channel under a compressive force applied to said fuel cell assembly, wherein said restraining includes abutting a first side of a support member with said flow field plate face, and abutting a second side of said support member with said resilient gas diffusion layer, said support member formed with a plurality of openings extending between said first and second sides, whereby fluid service is promoted.

2. The method of claim 1, further comprising maintaining with said support member a clamping pressure for an interface between said resilient gas diffusion layer and a portion of said membrane electrode assembly.

3. The method of claim 1, wherein said membrane electrode assembly includes a solid polymer electrolyte.

4. The method of claim 1, wherein said at least one fluid includes reactant fluid.

5. The method of claim 1, wherein said resilient gas diffusion layer includes at least one material selected from the group consisting essentially of carbon fabric, carbon fiber paper, carbon cloth and carbon paper.

6. The method of claim 1, wherein said support member comprises at least one material selected from the group consisting essentially of an expanded metal, an etched metal, a woven metal, a perforated foil, and a screen.

7. The method of claim 1, wherein said support member and/or said flow field plate face comprises non-magnetic, austenitic stainless steel.

8. The method of claim 1, wherein a number of said openings are adapted to communicate said at least one fluid between said open-faced flow channel and said resilient gas diffusion layer.

9. The method of claim 1, wherein said support member is spikeless and/or substantially flat.

10. The method of claim 1, wherein said flow field plate face forms solid sidewalls for said open-faced flow channel.

11. The method of claim 1, wherein said open-faced flow channel has a preselected configuration.

12. The method of claim 1, wherein said flow field plate face has a plurality of open-faced flow channels which are substantially parallel and/or generally serpentine, and wherein said flow field plate face forms solid sidewalls for said plurality of open-faced flow channels.

13. The method of claim 12, further comprising restraining said resilient gas diffusion layer against entering said plurality of open-faced flow channels under a compressive force applied to said fuel cell assembly.

14. The method of claim 1, wherein said support member is formed with an electrical path between said first and second sides, and wherein said electrical path is adapted to conduct between said resilient gas diffusion layer and at least one position on said flow field plate face, electrical current generated by said fuel cell assembly, whereby electrical conductivity is promoted.

15. The method of claim 14, wherein said at least one position includes a land on said flow field plate face.

16. A method of promoting electrical conductivity for a fuel cell assembly, said method comprising:
locating a resilient gas diffusion layer between a flow field plate face and a membrane electrode assembly of said fuel cell assembly, said resilient gas diffusion layer adapted to dynamically occupy a space in said fuel cell assembly;
maintaining a clamping pressure for an interface between said resilient gas diffusion layer and a portion of said membrane electrode assembly; and
wherein said maintaining includes abutting a first side of a support member with said flow field plate face, and abutting a second side of said support member with said resilient gas diffusion layer, wherein said support member is spikeless and/or substantially flat, said support member formed with an electrical path between said first and second sides, said electrical path adapted to conduct between said resilient gas diffusion layer and at least one position on said flow field plate face, electrical current generated by said fuel cell assembly, whereby electrical conductivity is promoted.

17. The method of claim 16, wherein said flow field plate face has an open-faced flow channel extending between entry and exit fluid manifolds for said fuel cell assembly, said open-faced flow channel adapted to service at least one fluid for said membrane electrode assembly; and further comprising:
restraining said resilient gas diffusion layer against entering said open-faced flow channel under a compressive force applied to said fuel cell assembly.

18. The method of claim 16, wherein said support member is formed with a plurality of openings extending between said first and second sides, whereby fluid service is promoted.

19. The method of claim 18, wherein a number of said openings are adapted to communicate at least one fluid between said open-faced flow channel and said resilient gas diffusion layer.

20. The method of claim 16, wherein said membrane electrode assembly includes a solid polymer electrolyte.

21. The method of claim 16, wherein said flow field plate face has an open-faced flow channel extending between entry and exit fluid manifolds for said fuel cell assembly, said open-faced flow channel adapted to service at least one fluid for said membrane electrode assembly, and wherein said at least one fluid includes reactant fluid.

22. The method of claim 16, wherein said resilient gas diffusion layer includes at least one materials selected from the group consisting essentially of carbon fabric, carbon fiber paper, carbon cloth and carbon paper.

23. The method of claim 16, wherein said support member comprises at least one material selected from the group consisting essentially of an expanded metal, an etched metal, a woven metal, a perforated foil, and a screen.

24. The method of claim 16, wherein said support member and/or said flow field plate face comprises non-magnetic, austenitic stainless steel.

25. The method of claim 16, wherein said flow field plate face forms solid sidewalls for an open-faced flow channel.

26. The method of claim 16, wherein said flow field plate face includes an open-faced flow channel having a preselected configuration.

27. The method of claim 16, wherein said flow field plate face has a plurality of open-faced flow channels which are substantially parallel and/or generally serpentine, and wherein said flow field plate face forms solid sidewalls for said plurality of open-faced flow channels.

28. The method of claim 27, further comprising restraining said resilient gas diffusion layer against entering said plurality of open-faced flow channels under a compressive force applied to said fuel cell assembly.

29. The method of claim 16, wherein said at least one position includes a land on said flow field plate face.

30. A fuel cell assembly unit, comprising:
a flow field plate having an open-faced flow channel formed in a face of said flow field plate, said open-faced flow channel extending between entry and exit fluid manifolds for a fuel cell assembly, said open-faced flow channel adapted to service at least one fluid for a membrane electrode assembly of said fuel cell assembly;
a resilient gas diffusion layer located between said flow field plate face and said membrane electrode assembly, said resilient gas diffusion layer adapted to dynamically occupy a space in said fuel cell assembly; and
a support member including first and second sides, said support member formed with a plurality of openings extending between said first and second sides, said first side abutting said flow field plate face, said second side abutting said resilient gas diffusion layer, said second side restraining said resilient gas diffusion layer against entering said open-faced flow channel under a compressive force applied to said fuel cell assembly.

31. The unit of claim 30, wherein said second side maintains a clamping pressure for an interface between said resilient gas diffusion layer and a portion of said membrane electrode assembly.

32. The unit of claim 30, further including said membrane electrode assembly and wherein said membrane electrode assembly includes a solid polymer electrolyte.

33. The unit of claim 30, wherein said at least one fluid includes reactant fluid.

34. The unit of claim 30, wherein said resilient gas diffusion layer includes at least one material selected from the group consisting essentially of carbon fabric, carbon fiber paper, carbon cloth and carbon paper.

35. The unit of claim 30, wherein said support member comprises at least one material selected from the group consisting essentially an expanded metal, an etched metal, a woven metal, a perforated foil, and a screen.

36. The unit of claim 30, wherein said support member and/or said flow field plate face comprises non-magnetic, austenitic stainless steel.

37. The unit of claim 30, wherein a number of said openings communicate said at least one fluid between said open-faced flow channel and said resilient gas diffusion layer.

38. The unit of claim 30, wherein said support member is spikeless and/or substantially flat.

39. The unit of claim 30, wherein said flow field plate face forms solid sidewalls for said open-faced flow channel.

40. The unit of claim 30, wherein said open-faced flow channel has a preselected configuration.

41. The unit of claim 30, wherein a plurality of open-faced flow channels which are substantially parallel and/or generally serpentine are formed in said flow field plate face, and wherein said flow field plate face forms solid sidewalls for said plurality of open-faced flow channels.

42. The unit of claim 41, wherein said second side restrains said resilient gas diffusion layer against entering said plurality of open-faced flow channels under a compressive force applied to said fuel cell assembly.

43. The unit of claim 30, wherein said support member is formed with an electrical path between said first and second sides, and wherein said electrical path conducts between said resilient gas diffusion layer and at least one position on said flow field plate face, electrical current generated by said fuel cell assembly.

44. The unit of claim 43, wherein said at least one position includes a land on said flow field plate face.

* * * * *

UNITED STATES PATENT AND TRADEMARK OFFICE
CERTIFICATE OF CORRECTION

PATENT NO. : 6,007,933
DATED : December 28, 1999
INVENTOR(S) : Daniel O. Jones

It is certified that error appears in the above-identified patent and that said Letters Patent is hereby corrected as shown below:

IN THE CLAIMS:

Claim 22, Col. 14, line 6, delete "materials" and replace with --material--.

Signed and Sealed this

First Day of August, 2000

*Attest:*

Q. TODD DICKINSON

*Attesting Officer*   *Director of Patents and Trademarks*